Dec. 6, 1960
M. FISCHER
2,963,286
LETTER WEIGHING SCALE
Filed July 9, 1959
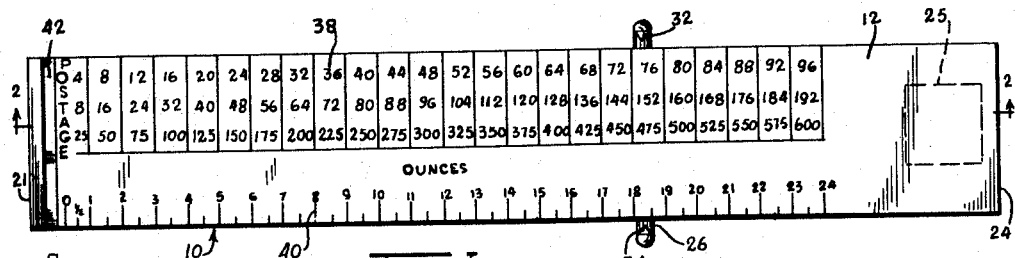
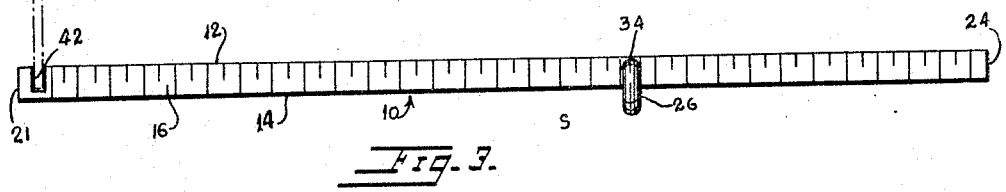
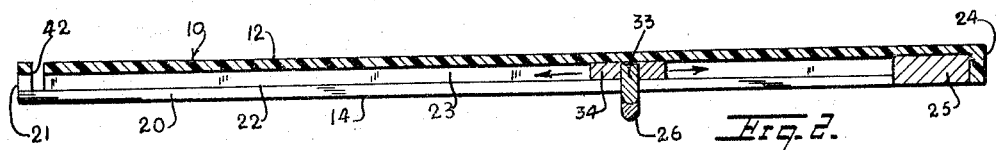
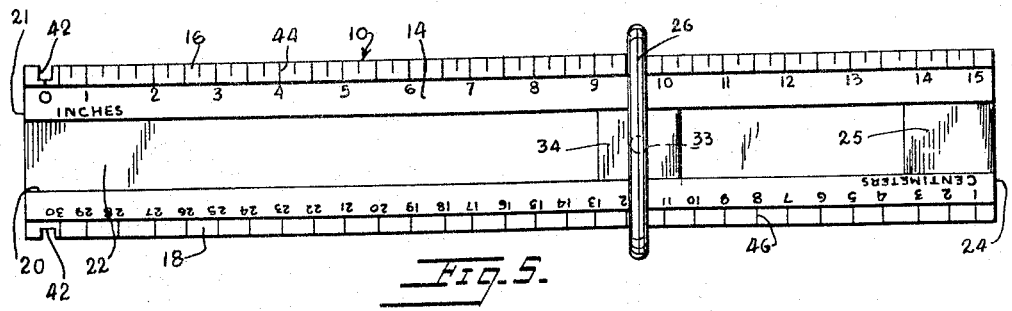
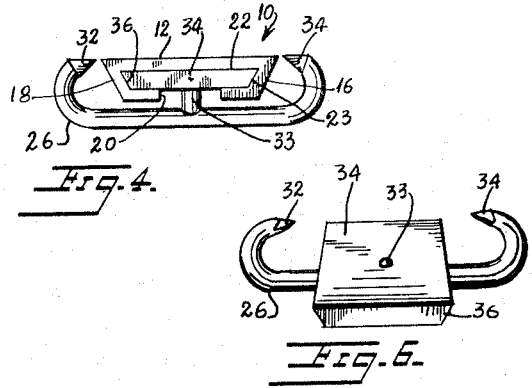
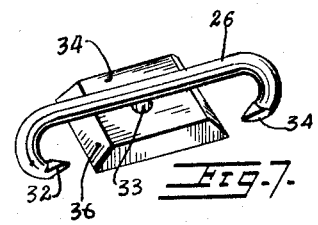
INVENTOR.
MAURICE FISCHER
BY
*ATTORNEY*

United States Patent Office 2,963,286
Patented Dec. 6, 1960

2,963,286

LETTER WEIGHING SCALE

Maurice Fischer, 845 West End Ave., New York, N.Y.

Filed July 9, 1959, Ser. No. 826,018

5 Claims. (Cl. 265—53)

This invention relates to the art of measuring devices and more particularly concerns a letter weighing scale.

According to the invention there is provided a flat bar having weight indicia and corresponding postage amounts marked on one side. The other side of the bar is marked with inch and centimeter scales. A dovetail groove is formed in the bar. In this groove is slidably disposed the base of a weight indicator. The bar rests on the weight indicator which serves as a fulcrum for balancing the bar. At one end of the bar is located a weight. At the other end of the bar is a slot for receiving a letter or other piece of mail to be weighed. The weight indicator is moved along the bar until the piece of mail balances the weight. Then the indicator points to the marked weight and postage amount due on the piece of mail. The bar can be turned over and used to measure the size of the piece of mail to determine compliance with postal regulations as to dimensions. The inverted bar can also be used as a ruler to rule lines where required.

It is therefore a principal object of the invention to provide a letter weighing device including a flat elongated bar provided with a sliding fulcrum.

It is a further object to provide a letter weighing device including a bar having a weight at one end and a letter receiving slot at the other end, with a fulcrum and weight indicator slidably mounted on the bar for balancing the letter against the weight, on the fulcrum, whereby the indicator shows the weight of the letter and the postage due thereon.

It is another object to provide a device of the character described wherein the bar has a flat top and flat bottom, with scales of length marked upon tapered edges of the bottom to serve as a length measuring means when a bar is in an inverted position.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a top plan view of the device embodying the invention.

Fig. 2 is a sectional view taken on line 2—2 of Fig. 1.

Fig. 3 is a side elevational view of the device, a letter to be weighed being shown in dot-dash lines.

Fig. 4 is an end view of the device.

Fig. 5 is a bottom plan view of the device on the same scale as Fig. 1.

Fig. 6 is a perspective view of the weight indicator and fulcrum.

Fig. 7 is a perspective view of the weight indicator and fulcrum in an inverted position.

Referring to the drawings, there is shown an elongated rectangular bar 10 having a wider upper side 12 and a narrower bottom side 14, with beveled edges 16 and 18. Formed in the bottom side is a slot 20 communicating with a dovetailed groove 22 in the body of the bar. At the inner end of the groove near one end 24 of the bar is a heavy weight 25 of lead, iron or the like. Slidably disposed on the bar is a generally U-shaped rod 26 having its free ends formed with points 32, 34. The bight of the rod is straight and disposed transversely across the bottom 14 of the bar. The rod is spaced from the bar by a short centrally disposed stem 33 which extends perpendicularly to the rod through slot 20 and is connected to a base block 34. This block has a trapezoidal cross section similar to that of the dovetailed groove 22 and slidable in the groove. The beveled edges 36 of the block fit within the beveled edges 23 of the groove as clearly shown in Fig. 4. The pointed ends of the rod are substantially coplanar with the wide top 12 of the bar. The pointed ends of the rod are spaced from and point to markings 38 and 40 on the top of the bar. Markings 38 indicate weights of pieces of mail to be weighed in the device and markings 40 indicate applicable postage charges. A transverse groove 42 is formed in the top of the bar near end 21. This groove is adapted to receive a letter or envelope L and support it in an upright position for weighing as indicated in dotted lines in Fig. 3. The beveled edges 16 and 18 are marked with inch and centimeter scales 44 and 46.

In operation of the device as a postal scale, a piece of mail is placed in the groove 42. The rod 26 is then moved along the bottom of the bar as indicated in Fig. 3 until the weight of the piece of mail balances the weight 25 with the rod serving as a fulcrum while resting on a surface S. The pointers 32 and 34 then point respectively to the postage charge for the piece of mail as well as to its weight in ounces on the graduated scales 38 and 40, respectively.

The bar can be turned over as indicated in Fig. 5 to rest on its wide side 12. The side 14 will then be uppermost so that the scales 44 and 46 can be used for measuring length in inches or centimeters as marked on the beveled edges 16 and 18, respectively. The straight edges can be used for ruling lines. Since the points of the rod 26 do not extend beyond the flat surface of side 12 the bar can lie flat on a table or the like when used as a ruler.

If desired, the weight 25 can be removed and replaced by a larger weight to change the range of weighing of the device. One or more of the others of scales 38 can be applicable to different weights 25. In a preferred size, the device is about fourteen inches long, but it may be fabricated in longer or shorter lengths. The device can be made of plastic, wood, metal or other composition material. It is rugged, and simple in construction, yet it provides more accurate weighing of mail than is possible with other postal scales employing complex mechanism for weighing.

While I have illustrated and described the preferred embodiment of my invention, it is to be understood that I do not limit myself to the precise construction herein disclosed and that various changes and modifications may be made within the scope of the invention as defined in the appended claims.

Having thus described my invention, what I claim as new, and desire to secure by United States Letters Patent is:

1. A postal scale and measuring device, comprising an elongated flat bar, said bar having a groove formed in one side thereof, and a rod disposed transversely across said one side, said rod having a base slidably disposed in said groove, said rod having an end portion disposed near the other side of the bar at an edge thereof, said bar having a graduated scale of weights at said edge, whereby said end portion of the rod points to one of said weights at each position of the rod along the bar, said bar having a slot at one end for holding a piece of mail therein, and a weight of predetermined size disposed in said groove at the other end of the bar, whereby the bar may be balanced on said rod as a fulcrum when a piece of mail is held by said means, said bar having opposite beveled edges, with scales of length marked on said beveled edges, said one side of the bar being narrower than said other side thereof, said end portion of the rod being pointed and substantially coplanar with said other side, whereby the bar can be placed flat on said other side to expose the beveled edges thereof.

2. A postal scale and measuring device, comprising an elongated flat bar having a slot formed in one side thereof, a dovetailed groove formed in the bar and communicating with said slot, a round rod disposed transversely across said one side and spaced therefrom, a base block slidably disposed in said groove, a stem connecting the rod and block and passing through said slot, said rod having curved pointed ends terminating near the edges of the opposite side of the bar, and scales of weights and postal charges of said edges of the bar, said pointed ends pointing to one of the weights and one of the postal charges in each position of the rod along the bar.

3. A postal scale and measuring device, comprising an elongated flat bar having a slot formed in one side thereof, a dovetailed groove formed in the bar and communicating with said slot, a round rod disposed transversely across said one side and spaced therefrom, a base block slidably disposed in said groove, a stem connecting the rod and block and passing through said slot, said rod having curved pointed ends terminating near the edges of the opposite side of the bar, and scales of weights and postal charges on said edges of the bar, said pointed ends pointing to one of the weights and one of the postal charges in each position of the rod along the bar, there being a transverse slot in said opposite side of the bar at one end thereof for holding a piece of mail thereon, and a weight secured to the bar at the other end thereof for balancing said piece of mail on said rod as a fulcrum.

4. A postal scale and measuring device, comprising an elongated flat bar having a slot formed in one side thereof, a dovetailed groove formed in the bar and communicating with said slot, a round rod disposed transversely across said one side and space therefrom, a base block slidably disposed in said groove, a stem connecting the rod and block and passing through said slot, said rod having curved pointed ends terminating near the edges of the opposite side of the bar, and scales of weights and postal charges on said edges of the bar, said pointed ends pointing to one of the weights and one of the postal charges in each position of the rod along the bar, there being a transverse slot in said opposite side of the bar at one end thereof for holding a piece of mail thereon, and a weight secured to the bar at the other end thereof for balancing said piece of mail on said rod as a fulcrum, said bar having beveled edges marked with scales of length.

5. A postal scale and measuring device, comprising an elongated flat bar having a slot formed in one side thereof, a dovetailed groove formed in the bar and communicating with said slot, a round rod disposed transversely across said one side and spaced therefrom, a base block slidably disposed in said groove, a stem connecting the rod and block and passing through said slot, said rod having curved pointed ends terminating near the edges of the opposite side of the bar, and scales of weights and postal charges on said edges of the bar, said pointed ends pointing to one of the weights and one of the postal charges in each position of the rod along the bar, there being a transverse slot in said opposite side of the bar at one end thereof for holding a piece of mail thereon, and a weight secured to the bar at the other end thereof for balancing said piece of mail on said rod as a fulcrum, said bar having beveled edges marked with scales of length, said block having beveled edges fitting into beveled edges of said groove.

References Cited in the file of this patent

UNITED STATES PATENTS

| | | |
|---|---|---|
| 440,959 | O'Marra | Nov. 18, 1890 |
| 1,045,425 | Millward | Nov. 26, 1912 |
| 1,201,063 | Litchfield | Oct. 10, 1916 |

FOREIGN PATENTS

| | | |
|---|---|---|
| 650,448 | Germany | Sept. 23, 1937 |
| 424,548 | Great Britain | Feb. 22, 1935 |